Sept. 12, 1944.  F. M. E. HOLMES ET AL  2,358,070
PROJECTION SCREEN
Filed June 25, 1942
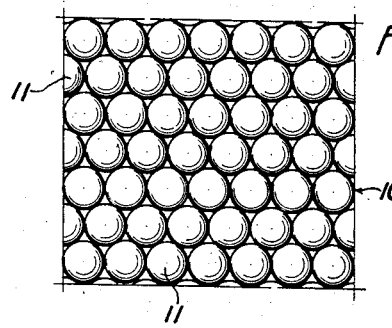
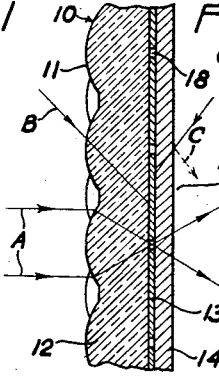
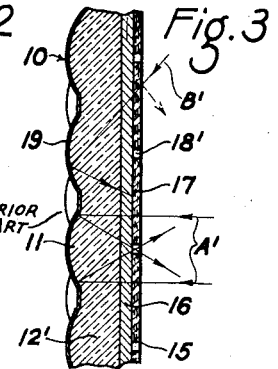
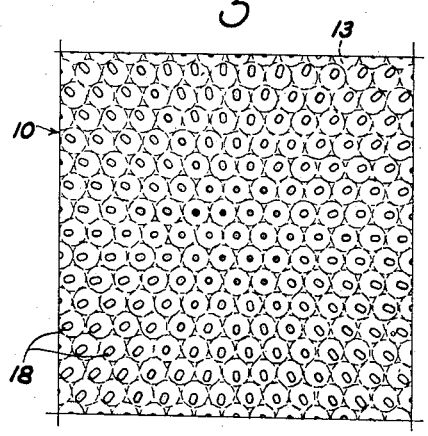
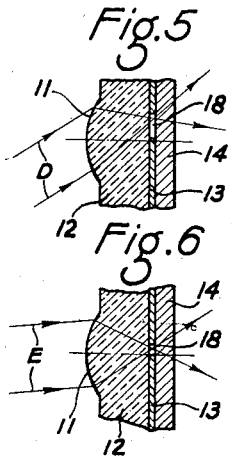
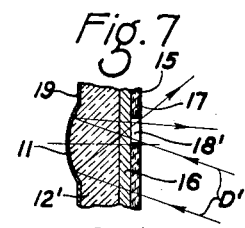
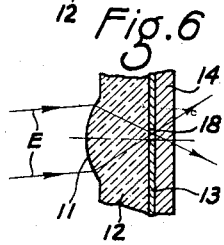
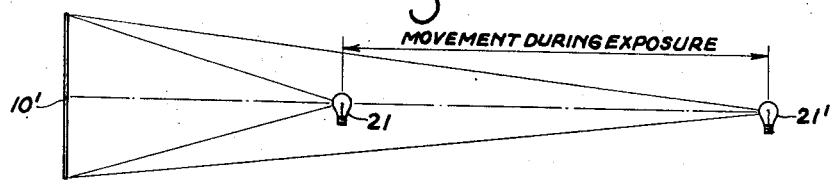
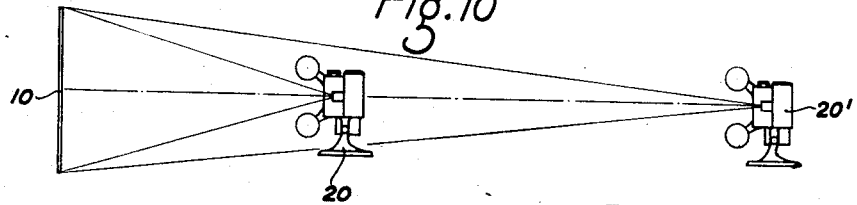
Frederick M. E. Holmes
Lloyd F. Seebach
INVENTORS
BY
ATTORNEYS Patented Sept. 12, 1944

2,358,070

UNITED STATES PATENT OFFICE 2,358,070

PROJECTION SCREEN

Frederick M. E. Holmes and Lloyd F. Seebach, Rochester, N. Y., assignors to Eastman Kodak Company, Rochester, N. Y., a corporation of New Jersey Application June 25, 1942, Serial No. 448,362

7 Claims. (Cl. 88—28.90)

The present invention relates to projection screens and more particularly to a screen of the type having a lenticulated support and a light absorbing layer.

It is known in the art of projection screens to provide a light absorbing layer with non-absorbing portions to permit the transmission or reflection of the light from the projector. If the audience and the projector are on opposite sides of the screen, the screen is known as a transmission or rear view screen, and if the audience and projector are on the same side of the screen, the screen is known as a reflecting screen. In either case, the screen has a light absorbing layer which faces the audience and has a black or darkened appearance which enhances its use under daylight conditions. Usually screens of these types are provided with a rear surface having a plurality of lenticular elements formed therein which cause the light to be brought to focus on the light absorbing layer. The light focused on this layer reaches the eyes of the audience through the non-absorbing areas or spots in the light absorbing layer at the foci of the lenticular elements.

The light absorbing layer is in general made from a light sensitive material, such as photographic emulsion or a circular polarizing sheet which may be made non-absorbing by exposing to a light source. Heretofore, the non-absorbing areas or spots were formed in the light sensitive layer by placing a light source in the same position with respect to the screen as the projector would occupy and exposing the light sensitive layer. When the non-absorbing areas are formed in this manner, the efficiency of the screen is greatest when the projector occupies the same position with respect to the screen as the exposing light source. If the projector is moved closer to the screen or moved away from the screen, the efficiency of the screen falls off particularly toward the edges of the screen, because not all the light is reaching the eyes of the audience. The object of the invention is to provide a screen of this type with which it is permissible to place the projector at any convenient distance with respect to the screen.

The present invention provides a screen in which the non-absorbing areas or spots are formed in the same manner as heretofore except that the exposing light is moved during exposure from the maximum to the minimum position that the projector can occupy with respect to the screen. The areas or spots thus formed assume the shape of a slit which increase in radial length progressively from the axis of the screen toward the edges thereof. When the present invention is used, the position of the projector is not critical as regards to the efficiency of the screen. The practical advantages of such an arrangement are obvious.

Thus, an object of the invention is to provide a screen which except for the desired image appears dark or black to the observer.

Another object of the invention is to provide a screen which will receive all the light incident thereon but will display to an observer only the light coming from the projector.

The object of the present invention which constitutes its advantage over previous screens of this nature was pointed out above and is to permit the display of the projected image independent of the projector distance.

Further objects and advantages will be apparent to those skilled in the art by the description which follows:

The above and other objects are provided by a projection screen in which a light transmitting support has lenticular elements formed in one surface thereof and a light absorbing layer on the other surface with non-absorbing areas or spots at the foci of the elements to permit only that light coming from the projector to reach the audience. According to the invention, the spots increase in radial length progressively from the axis of the screen toward the edges of the screen to permit the use of the projector at various positions with respect to the screen.

Reference is hereby made to the accompanying drawing in which like numerals and characters designate similar parts and wherein:

Fig. 1 is a rear view of a portion of the screen showing the arrangement of the lenticular elements;

Fig. 2 is an enlarged vertical section through a transmission type of screen using a photographic emulsion as a light absorbing layer with the non-absorbing spots concentric with the axis of its corresponding element;

Fig. 3 is a view similar to Fig. 2 but using a circular polarizing sheet as a light absorbing layer in a reflecting type of screen;

Fig. 4 is an exaggerated front view of a screen according to the invention showing the increase in radial length of the non-absorbing spots toward the edges of the screen;

Fig. 5 is an enlarged radial section of one of the lenticular elements in a transmission screen near the edge of the screen and showing the increased length of the non-absorbing spot;

Fig. 6 is a view similar to Fig. 5 but showing the non-absorbing spot near the center of the screen;

Fig. 7 is an enlarged radial section of one of the lenticular elements in a reflecting screen near the edge of the screen and showing the increased length of the non-absorbing spot;

Fig. 8 is a view similar to Fig. 7 but showing the non-absorbing spot near the center of the screen;

Fig. 9 is a diagrammatic view showing the method of exposing the screen for obtaining the non-absorbing spots at the foci of the lenticular elements.

Fig. 10 is a diagrammatic view showing the maximum and minimum distance of a projector with respect to the screen.

As shown in Fig. 1, the screen 10 has formed in one surface thereof a plurality of lenticular elements 11 which, as is known in the art, will focus the light incident thereon onto a light absorbing layer. This type of screen is well known in the art and, as shown in Figs. 2 and 3, may be of the transmission or rear view type of screen, or a reflecting or front view type of screen. Thus, Figs. 2 and 3 may be considered as illustrative of the prior art; however the paraxial zones of our screens do not differ therefrom appreciably. Figs. 2 and 3 represent such zones.

The transmission type of screen, as shown in Fig. 2, comprises a light transmitting support 12 with lenticular elements 11 formed in the rear surface thereof, and a light absorbing layer 13 adjacent the front surface of the support 12 in the focal plane of the lenticular elements having a clear area at the exit pupil of each element. A protective coating 14 may be included, if desired.

The reflection type of screen, as shown in Fig. 3 constitutes a combination of the present invention with that of Stephen M. MacNielle Serial No. 445,579, filed June 3, 1942, and comprises a light transmitting support 12', and a circular polarizer 15 which consists of a quarter-wave retardation layer 16 and a plane polarizing layer 17 with its axis oriented at 45° to the optic axis of the quarter-wave retardation layer 16. Attention is drawn at this point to the difference between a quarter-wave retardation layer which is well known to those skilled in the study of polarized light and an optical interference layer, which if it is a single layer, is generally one-quarter wave length thick. A quarter-wave retardation layer is usually much thicker; i. e., of sufficient thickness for the ordinary and extraordinary rays passing therethrough to gain a difference in phase of one-quarter wave length. In the screen shown, the quarter-wave retardation layer is a sheet of birefringent material, such as that now commercially known as Cellophane, of the proper thickness and orientation. It is to be understood, of course, that any quarter-wave retardation layer will do.

The lenticular elements 11 are formed in the rear surface of the support 12' and are covered with a metallic coating 19 of aluminum or silver. The circular polarizer 15 lies adjacent the front surface of the support 12' substantially in the focal plane of the lenticular elements and has depolarized areas or spots 18' at the foci of each element.

MacNielle's screen is provided with non-absorbing or depolarized areas or spots, for example, by exposing the screen to an intense light source. The light source is placed in the same position with respect to the screen as the projector which is to be used. The polarizing quality of the polarizing sheet 17 is destroyed at the foci of the lenticular elements by the light focused thereon.

It can be readily appreciated that screens produced as described above are limited in their use since the maximum efficiency of the screen is obtained only when the projector is placed in the same position with respect to the screen as that occupied by the exposing light source. As the projector is moved toward or away from the screen with respect to this particular position, the light incident on the edges of the screen is absorbed and fails to reach the eyes of the audience.

This disadvantage is overcome by a screen according to the present invention, and one method of making our screen, as shown in Fig. 9, in which a light source 21 is moved during the exposure of a photosensitive surface 10' between the maximum and minimum positions that the projector may occupy with respect to the final screen. By exposing the screen in this manner, the non-absorbing areas are increased in radial length progressively toward the edges of the screen as required and when used with a projector anywhere in the range allowed, permits the transmission or return of all the light from the projector. The sensitive film 10' has the lenticular surface facing the source 21 and the photographic emulsion on the other surface facing away from the source 21 for the transmission type of screen. Similarly, for a reflecting type it has reflecting lenticules on the opposite face and has a sensitive layer on the side toward the source 21 and which is processable to a circular polarizer with non-polarizing spots after exposure.

In Fig. 10, a screen 10 made from the sensitive material 10' is axially positioned in front of a projector 20. The projector 20 may assume any position with respect to the screen in the range between the two positions 20 and 20' indicated. As shown, the screen 10 may be either a transmission or reflection screen depending on which side of the screen the audience is located. Of course, it is also to be understood that the proper surface of the screen 10 is facing the projector with respect to whichever screen is being used.

In Fig. 2, the non-absorbing spots 18 in the paraxial region of the screen i. e., those spots immediately surrounding the axis of the screen, are substantially concentric with the axes of their corresponding lenticular elements. The light from the projector, designated by A, is substantially parallel to the axes of the screen and is projected onto the lenticules 11 which focus the light on the spots 18 and then passes through the coating 14 to the eyes of the audience. In the paraxial region of the screen, the light will be more or less uniformly parallel to the axis of the screen irrespective of the position of the projector. Any extraneous light, as designated by B, is absorbed by the layer 14 and does not reach the audience with the exception of some purely specular and hence unavoidable reflection from the surface of the support 14, as indicated by the broken line C.

In Fig. 5, the non-absorbing area or spot 18, which is near the edge of the screen, is longer and decentered with respect to the axis of its lenticular element to permit the transmission of the light to the audience for all positions of the projector with respect to the screen. The light, as designated by D, coming from the position of the projector nearest to the screen is focused near the top of the spot 18 and then passes through the support 14 to the audience.

As the projector is moved away from the screen to its farthest position, the angle of incidence of the light on the lenticular elements decreases and the focal point will move radially toward the axis of the screen, until at the farthest distance the light will be focused near the bottom of the spot 18.

In Fig. 6, the spot 18 is just beyond the paraxial region of the screen. The light, as designated by E, coming from the projector is focused near the top of the spot 18, which is decentered with respect to the axis of its lenticular element but not to the same extent as in Fig. 5. As the projector is moved away from the screen toward its maximum position the angle of incidence of the light on the lenticular elements decreases and the focal point moves radially toward the axis of the screen. The amount of movement will not be as great as in Fig. 5, and therefore the spot 18 is not as long. The progressive increase in the length and decentering of the spots 18 radially from the axis of the screen is more clearly shown in Fig. 4.

In Fig. 3, the non-absorbing or non circularly-polarizing spots 18' in the paraxial region of the screen are substantially concentric with the axis of their corresponding lenticular elements. The light, as designated by A', from the projector is substantially parallel to the axis of the screen and on passing through the plane polarizing layer 17 and the quarter-wave retardation layer 16 becomes circularly polarized and is then reflected and focused by the layer 19 on the plane polarizer 17 at the spots 18. The reflected light in passing through the quarter-wave retardation layer is reverted to plane polarized light which is viewed by the observer. The extraneous light, as designated by B', on passing through the plane polarizer 17 is plane polarized and after passing through the quarter-wave retardation layer 16 is circularly polarized. After reflection, at least part of the light is still circularly polarized but is rotating in the opposite direction when it strikes the quarter-wave retardation layer 16, and in passing through this layer it again becomes plane polarized. Since the resulting plane of polarization is crossed with respect to the plane polarizer 17, this reflected extraneous light cannot reach the eye of the observer.

In Figs. 7 and 8, as in Figs. 5 and 6, the non-circularly-polarizing spots 18' increase in radial length toward the edges of the screen. In Figs. 7 and 8, of course, the light is reflected, but the extent of progressive increase in radial length from the axis of the screen will be substantially the same.

The radial length, size and shape of the exit pupils in the front surface layer according to the invention and on account of axial movement of the light source are different from any elongation, size or shape of such exit pupils by reason of the optical characteristics of the lenticular elements and angle of incidence from a stationary light source.

Having now particularly described our invention, what we desire to secure by Letters Patent of the United States and what we claim is:

1. A screen for displaying optical images projected thereonto comprising a light transmitting support having opposite surfaces and a plurality of lenticular elements on one surface of said support for focusing light substantially on the other surface thereof, and means on the said other surface having an exit pupil in front of each element for permitting the transmission of only that light coming to the elements from a point on the axis of the screen, said screen being characterized by the fact that exit pupils having a radial length corresponding to the path of the image of a light source moved along the axis of the screen and having a size and shape different from those corresponding to the optical characteristics of the lenticular elements and angle of incidence of a stationary light source.

2. A screen of the transmission type for displaying optical images projected thereonto by a projector comprising a light transmitting support with a plurality of juxtaposed elements on the rear surface concave to the front surface of said support, and a light absorbing layer substantially in the focal plane of said elements and having a non-absorbing spot in front of each element, said spot including the point at which light from the projector is focused by the corresponding element, said screen being characterized by the fact that said spots having a radial length corresponding to the path of the image of the light source moved along the axis of the screen and having a size and shape different from those corresponding to the optical characteristics of the lenticular elements and angle of incidence of a stationary light source.

3. A screen for displaying optical images projected thereonto by a projector axially positioned in front of the screen comprising a light reflecting surface with a plurality of juxtaposed elements concave to the front, and a circular polarizing sheet substantially in the focal plane of said elements and facing away from said surface, said circular polarizing sheet having a non circularly-polarizing spot in front of each element, said spot including the point at which light from the projector is focused by the corresponding element, said screen being characterized by the fact that said spots increase in radial length progressively from the axis of the screen toward the edges of the screen.

4. A screen for displaying optical images projected thereonto by a projector axially positioned in front of the screen comprising a light reflecting surface with a plurality of juxtaposed elements concave to the front, and a circular polarizing sheet substantially in the focal plane of said elements and facing away from said surface, said circular polarizing sheet having a non circularly-polarizing spot in front of each element, said spot including the point at which light from the projector is focused by the corresponding element, said screen being characterized by the fact that each spot in the paraxial region of the screen is concentric with the axis of its corresponding element and each spot beyond the paraxial region is decentered radially toward the edge of the screen with respect to the axis of its corresponding element and increases in radial length progressively from the axis of said screen toward the edges of the screen.

5. The method of making a screen from a light transmitting support with lenticular elements formed therein which comprises exposing to a beam of light from a light source a light sensitive layer on said support at the foci of said elements, and moving said light source axially with respect to said support during the exposing between positions corresponding to maximum and minimum displacements of a projector from the screen whereby the light focused by said elements on said layer forms non-absorbing elongated exit pupils having a size and shape different from those corresponding to the optical characteristics of the lenticular elements and angle of incidence of a stationary light source.

6. The method of making a screen from a light transmitting support with lenticular elements formed therein which comprises exposing to a beam of light from a light source a layer of photographic emulsion on said support at the foci of said elements, moving said light source axially with respect to said support during the exposing between positions corresponding to maximum and minimum displacements of a projector from the screen and reversally processing the photographic layer to form at the foci of said elements non-absorbing elongated exit pupils having a size and shape different from those corresponding to the optical characteristics of the lenticular elements and angle of incident light of a stationary light source.

7. The method of making a screen from a light transmitting support with lenticular elements formed therein which comprises exposing to a beam of light from a light source a circular polarizing sheet on said support at the foci of said elements, the polarizing power of said sheet being destroyed by exposure to intense light, and moving said light source axially with respect to said support during the exposing between positions corresponding to maximum and minimum displacements of a projector from the screen whereby the light focused by said elements on said sheet forms non-polarizing areas whose extent radial from the axis of the screen increases progressively toward the edges of the screen.

FREDERICK M. E. HOLMES.
LLOYD F. SEEBACH.